United States Patent [19]

Stoiber

[11] Patent Number: 5,744,879
[45] Date of Patent: Apr. 28, 1998

[54] SYNCHRONOUS LINEAR MOTOR

[75] Inventor: Dietmar Stoiber, Grünwald, Germany

[73] Assignee: Krauss-Maffei AG, Munich, Germany

[21] Appl. No.: 809,737

[22] PCT Filed: Jul. 20, 1996

[86] PCT No.: PCT/EP96/02684

§ 371 Date: Mar. 27, 1997

§ 102(e) Date: Mar. 27, 1997

[87] PCT Pub. No.: WO97/05688

PCT Pub. Date: Feb. 13, 1997

[30] Foreign Application Priority Data

Jul. 31, 1995 [DE] Germany .................. 195 28 043.1

[51] Int. Cl.$^6$ .................................................. H02K 41/03
[52] U.S. Cl. .................................................. 310/12; 310/14
[58] Field of Search .................................. 310/12, 13, 14;
318/135

[56] References Cited

U.S. PATENT DOCUMENTS 4,868,431 9/1989 Karita et al. ........................ 310/12
4,908,533 3/1990 Karita et al. ........................ 310/15
5,166,563 11/1992 Bassine ................................ 310/15

FOREIGN PATENT DOCUMENTS 0 334 645 9/1989 European Pat. Off. .

Primary Examiner—Steven L. Stephan
Assistant Examiner—Judson H. Jones
Attorney, Agent, or Firm—Henry M. Feiereisen

[57] ABSTRACT

To improve the movement precision of a synchronous linear motor, it is proposed that the front and rear end faces (11, 12) of the primary section (10) be ungrooved and not wound and bevelled in sections in such a way that the angle of inclination ($\beta$) of the bevelled surfaces (11a, 12a) on the front and rear end faces (11, 12) of the primary section (10) in relation to the longitudinal axis (13) of the motor is selected according to the relation: $\beta=\arctan(b/\tau_p)$ where $\beta$ is the angle of inclination of the bevelled surfaces (11a, 12a) at the front and rear end faces (11, 12) of the primary section (10), b is the electrically active width of the primary section (10) and $\tau_p$ is the pitch of the poles (21, 22) of the secondary section (20).

11 Claims, 4 Drawing Sheets

SYNCHRONOUS LINEAR MOTOR

BACKGROUND OF THE INVENTION

The invention relates to a synchronous linear motor of a type including a primary section having rotor grooves for receiving a single-phase or multi-phase rotor winding, and a secondary section including a sequence of permanent magnets, each of the magnets having two pole pairs acting as north and south poles, with the length of the secondary section in the moving direction exceeding the length of the primary section. A synchronous linear motor of this type is known from U.S. Pat. No. 4,908,533.

High quality synchronous motors for applications as actuating motors should generate forces rather uniformly and without malfunctioning. In rotating synchronous motors, periodic variations in force ("force waviness") occur which are mainly caused by grooves disposed on the stator. In order to compensate for the force waviness as well as for all other effects on the drive shaft torque caused by the grooves, the rotor and stator poles are usually beveled across the width of a groove.

There is also known from U.S. Pat. No. 4,908,533 for synchronous linear motors, that the force waviness can be reduced by beveling the poles across the width of a groove of the wound primary section. Since in top plan view, the edges of the faces of the primary section are parallel to the grooves in the primary section, both the front and rear faces of the poles are beveled in the conventional beveling operation of the grooves. The force waviness can also be reduced by a method known from EP 0 334 645 A1, wherein the core of the primary section of a synchronous linear motor is formed as a ferromagnetic plate and coils are placed in the air gap of the linear motor in such a way that the face regions of the plate project beyond the air gap coils and form a step along the longitudinal median line of the linear motor.

In contrast to rotating synchronous motors which continue indefinitely when viewed along the circumference, the synchronous linear motor is special in that it has a beginning and an end. At the transition points at the beginning and the end of a synchronous linear motor, there are generated periodic motor end forces in the moving direction which adversely effect the operation of the linear motor. The motor end forces are generated because the linear motor covers the magnetic poles differently, depending on the motor position. As a result, there exist preferred positions where the stored magnetic energy of the linear motor is particularly large. Additional forces are then required in order to move the linear motor away from these preferred positions. The force with which the linear motor pulls itself into the preferred positions of the magnetic poles, is called "pole force." The pole force can reach up to approximately 25% of the rated motor force. There exists a preferred position above each magnetic pole. Consequently, the pole force has the same periodicity as the magnetic poles and interferes with the motor force; this phenomenon is referred to as "pole waviness." Since the pole force does not depend on the motor current, it represents a passive force which is also present in the absence of current. The pole force does not perform any work, because it operates alternating in the moving direction and opposite to the moving direction of the linear motor. During operation, the pole force is added to the force generated by the motor current. The pole force has nothing in common with the groove force which is the force describing the interaction between the edges of the magnetic poles and the stator grooves.

In the conventional synchronous linear motor, the aforedescribed "pole waviness" causes an imprecise movement which is particularly undesirable if such motors are used as precision actuators.

SUMMARY OF THE INVENTION

Therefore, it is the object of the invention to improve the motion accuracy of a synchronous linear motor of the abovedescribed type.

The object of the invention is attained by providing the primary section with front and rear end faces which are free of grooves and free of a winding and exhibit areas extending perpendicular to an air gap zone between the primary section and the secondary section and being beveled such as to define an angle of inclination which is selected with respect to the longitudinal axis in accordance with the following relationship:

$$\beta = \arctan(b/\tau_p),$$

wherein $\beta$ is the angle of inclination of the beveled areas at the front and rear end faces of the primary section, b is the electrically active width of the primary section, and $\tau_p$ is the pitch of the poles of the secondary section.

Preferred embodiments and improvements of the synchronous linear motor according to the invention appear in the dependent claims.

In the synchronous linear motor of the invention, both motor ends are beveled by the width of a magnetic pole. The beveled motor end region is neither grooved nor does it have a winding. In contrast to the conventional measures for eliminating groove forces described above, the synchronous linear motor of the invention is not changed in the regions of the linear motor winding. In the present invention, both motor ends are beveled by the width of a magnetic pole; consequently, each pole force components on the front face of the linear motor is matched by an exactly identical pole force components at the rear face of the linear motor. In order to compensate the pole forces completely, the motor end has to be beveled across the entire width of the magnetic pole. The pole force compensation will be insufficient if the faces are beveled to a lesser or greater extent. This is the reason why the pole waviness is not eliminated when in order to prevent groove disturbances, the grooves are beveled in the aforedescribed manner, and the motor faces are simultaneously beveled parallel by about one groove interval. In general, three or six grooves, respectively, cover the magnetic pole of a linear motor which is equivalent to beveling the motor faces only across one third or one sixth, respectively, of a magnetic pole, when beveled conventionally over one groove.

If the magnetic poles of the secondary section extending over the width of one groove are to be beveled in order to compensate the groove-induced force waviness, then according to the invention, the bevel of the end faces of the primary section has to be increased or decreased by the bevel of the magnetic poles, depending on the direction of the bevel on the end faces, i.e. if the magnetic poles are beveled in the same direction as the faces of the primary section or in the direction opposite to the direction of the front faces of the primary section.

The end faces of the motor which, according to the invention, are beveled over the width of a magnetic pole, have no winding and thus do not require grooves. The best result is achieved when the bevel of the faces of the primary section towards the secondary section forms a smooth surface with the same air gap as the linear motor.

BRIEF DESCRIPTION OF THE DRAWINGS

The invention will be described hereinafter with reference to embodiments shown in the drawings. It is shown in.

DETAILED DESCRIPTION OF PREFERRED EMBODIMENT

Figure 1:
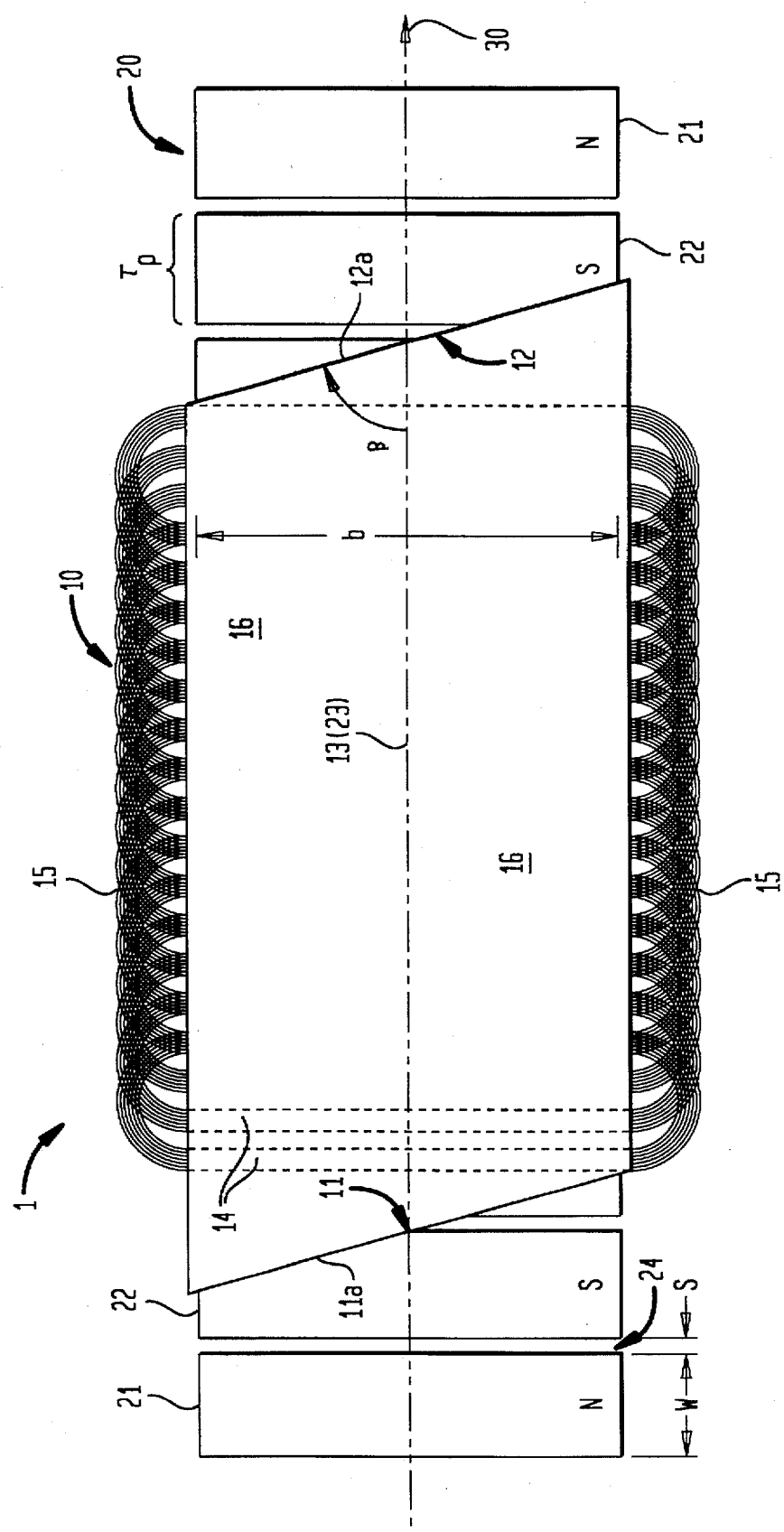
FIG. 1 a schematic top plan view of a first embodiment of a synchronous linear motor according to the invention.
Figure 3:
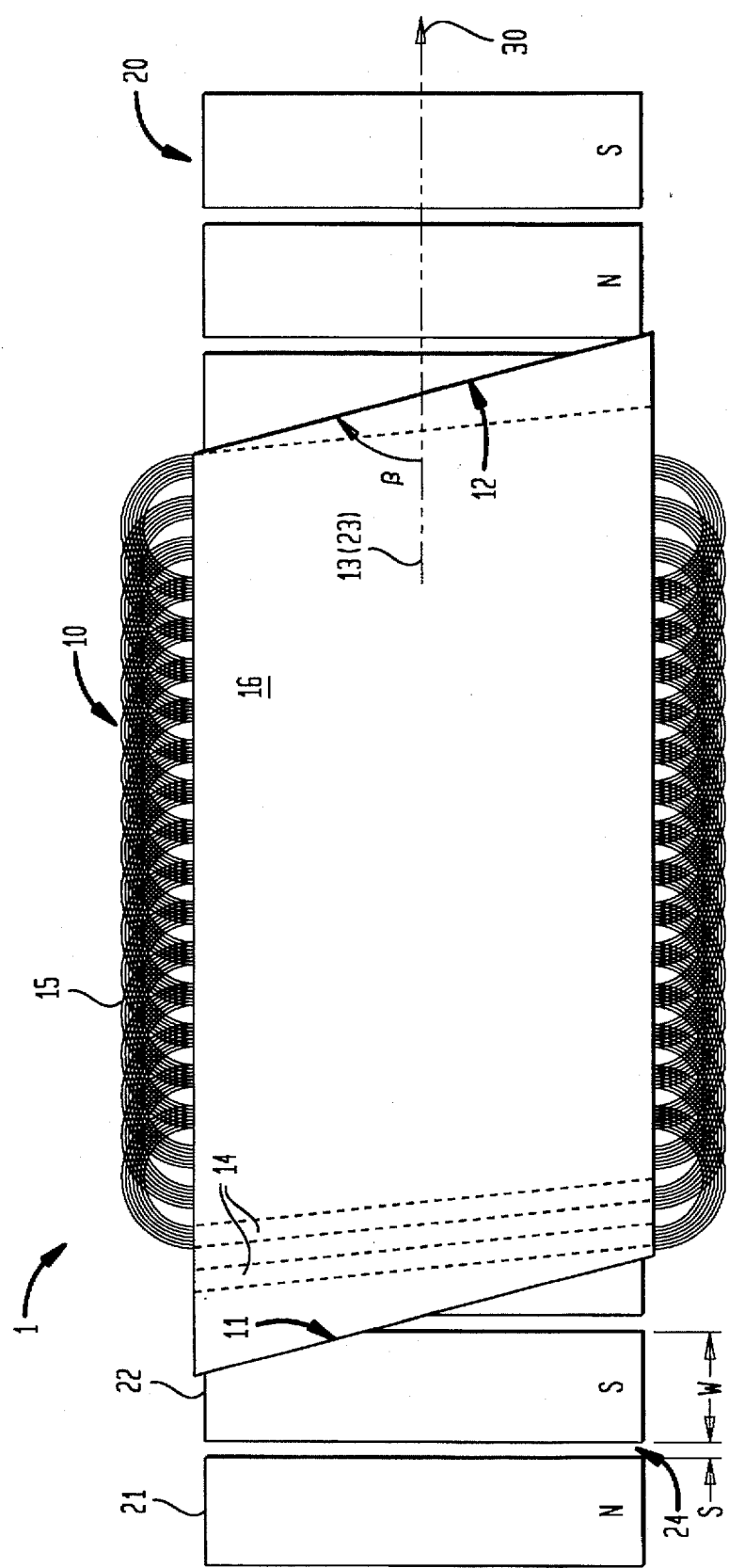
FIG. 3 a top plan view of a third embodiment of a synchronous linear motor according to the invention, wherein—in contrast to FIG. 1—the rotor grooves are beveled.

In FIG. 1, there is shown a top plan view of a synchronous linear motor 1 according to the invention, consisting in the conventional manner of a primary section or rotor 10 and a secondary section 20. The moving direction of the linear motor 1 is indicated by an arrow 30. The length of the primary section 10 in the moving direction 30 is less than the length of the secondary section 20. The primary section 10 includes a stratified sheet metal body 16 with parallel extending rotor grooves 14, of which rotor grooves 14 only two are indicated by II dotted lines at the left edge of the sheet metal packet 16. In the example of FIG. 1, the longitudinal axes of the rotor grooves 14 extend perpendicular to the longitudinal axis 13 of the primary section 10 and the coinciding longitudinal axis 23 of the secondary section 20. Alternatively, as shown in FIG. 3, the rotor grooves 14 may also be formed at an angle of inclination which is different from 90° with respect to the longitudinal axis 13 of the primary section 10. In the rotor grooves 14, there is disposed a two-phase or three-phase rotor winding, which is electrically excited in a manner not shown here by a two-phase or three-phase AC voltage.

The, for example, stationary secondary section consists of a plurality of permanent magnets arranged successively in the moving direction, with each of the permanent magnets having a north pole 21 and a south pole 22. Between the poles 21, 22 of each pole pair 21/22 having a width $W_1$ there is disposed a small pole gap 24 having a gap width s. The longitudinal axes of the pole gaps 24 in the embodiment of FIG. 1 extend perpendicular to the longitudinal axis 13 of the primary section 10 and are thus oriented in the same direction as the longitudinal axes of the rotor grooves 14.

When the rotor windings 15 are excited, an electromotoric force is induced which moves, for example, the primary section 10 secured underneath a carriage relative to the stationary secondary section 20 in the direction of the arrow 30. The motion of the primary section 10 is synchronous with the frequency of the two-phase or three-phase AC voltage exciting the primary section 10, which gives this type of linear motor the name synchronous linear motor.

Figure 4:
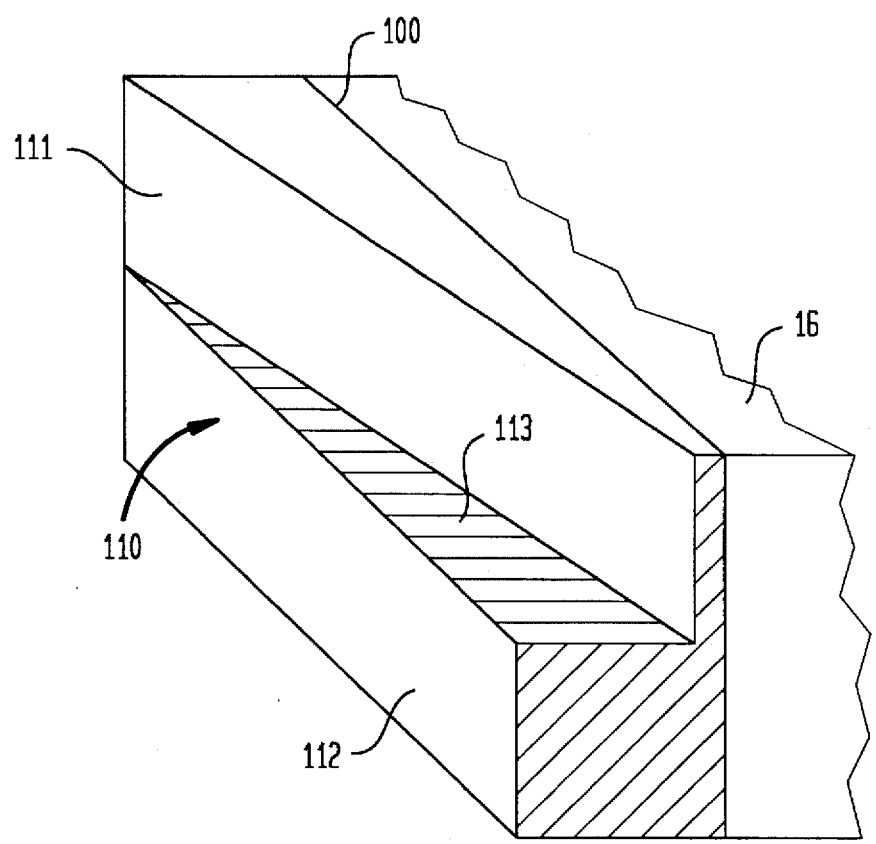
FIG. 4 a perspective view of an attachment formed according to the invention for the front and rear face of a primary section.

According to the invention, the end faces 11, 12 of the sheet metal packet 16 of the primary section 10 are formed ungrooved and are beveled by the width W of a magnetic pole 21, 22, thereby forming an angle of inclination β with respect to the longitudinal axis 13. This bevel of the front faces 11, 12 is formed either over the entire end faces 11a, 12a, as shown in FIG. 1, or only over a section thereof, as shown in the form of an attachment element 100 in FIG. 4. The ungrooved attachment element 100 is secured to each axial end of the sheet metal body 16, thereby allowing manufacture of the sheet metal body 16 in a conventional fashion with grooves 14 and windings 15. Each attachment element 100 has the sheet metal arranged perpendicular to the air gap zone between the primary section 10 and the secondary section 20, wherein the orientation of the stratified sheet metal is preferably the same as the orientation of the sheet metal body 16. In the embodiment of FIG. 4, the end face 110 has a beveled face section 111 and an unbeveled, straight face section 112, with a horizontal step with a triangular cross-section disposed between the face sections 111 and 112. The height of the beveled face section 111 is, for example, more than five times the height of the air gap between the primary section 10 and the secondary section 20. Such partial bevel of the end faces 11a, 12a (which can not only be attained with attachment elements 100, but also with a single-piece design of the sheet metal body 16) increases the mechanical strength of the sheet metal attachment elements 100. The attachment elements 100 can be formed in such a way that they can be screwed directly to the ends of the rectangular sheet metal packet 16. In addition, the attachment elements 100 can be secured to the same machine component (not shown) as the sheet metal packet 16. In this case, the attachment holes (not shown) for the sheet metal packet 16 are extended up to the attachment elements 100.

If the faces of the sheet metal packet 16 are made of a single piece, then the individual core sheets of the grooved sheet metal packet 16 can have an ungrooved projection of different length. When the individual sheets are assembled into the sheet metal packet 16, then the projections of different length form the beveled faces of the primary section 10. If it is too costly to fabricate individual sheet metal sections with different length in order to obtain a beveled face on the primary section 10, then the bevel can also be formed by milling the finished sheet metal body 16. Hereby, it is sufficient if the bevel extends only over a portion of the height of the sheet metal packet 16, as is depicted in FIG. 4 for the attachment elements 100.

Figure 2:
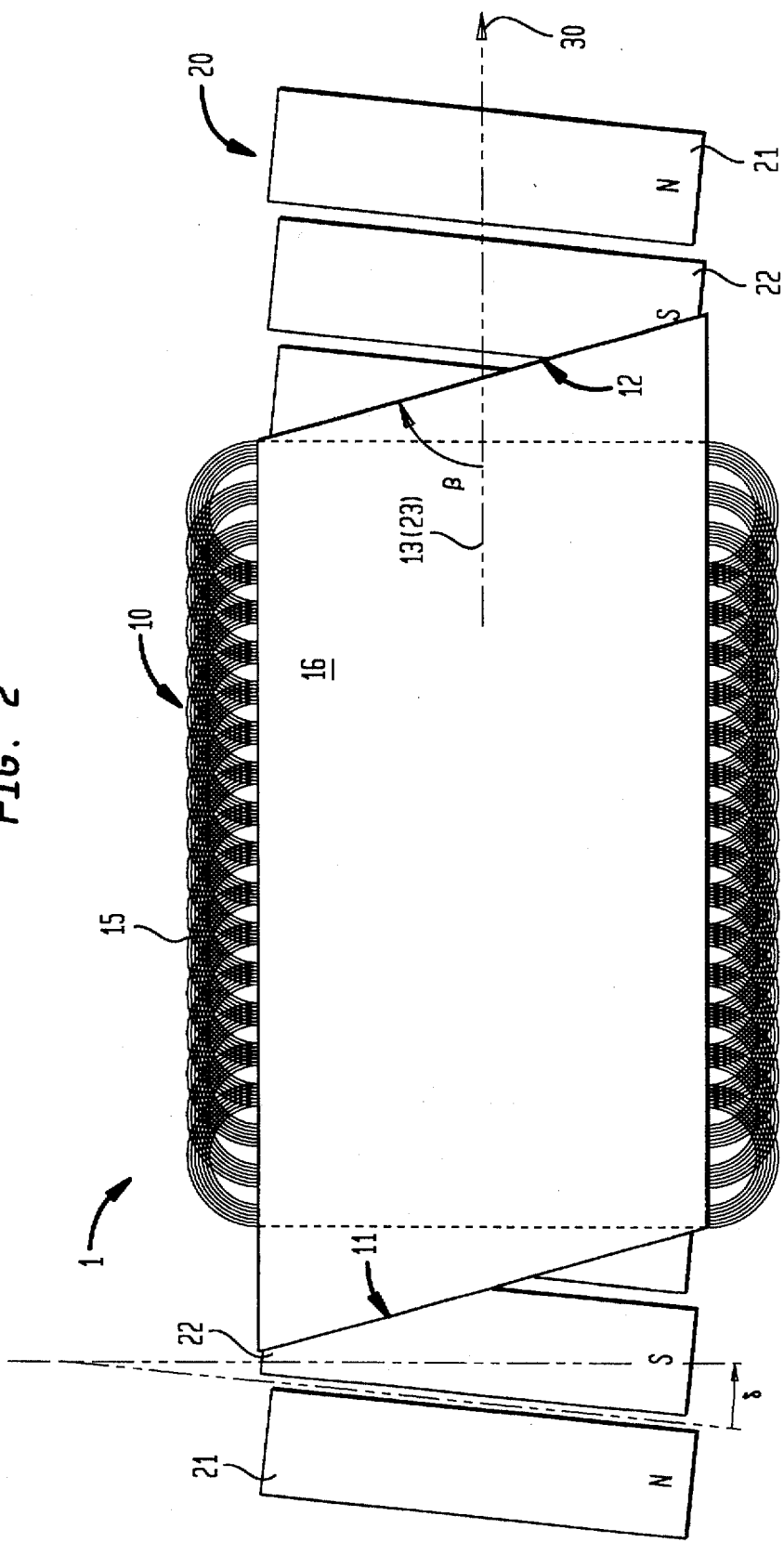
FIG. 2 a top plan view of a second embodiment of a synchronous linear motor according to the invention, wherein—in contrast to FIG. 1—the pole gaps of the secondary section are beveled.

In the further embodiment of the synchronous linear motor of the invention, shown in FIG. 2, the magnetic poles 21, 22 of the secondary section 20 are beveled at an angle δ perpendicular to the moving direction 30 for the purpose of compensating the groove-induced force waviness. The magnetic poles 21, 22 can be beveled, as shown in FIG. 2, in the direction of the bevel of the end faces 11, 12 of the primary section 10. However, it is also feasible to bevel the magnetic poles 21, 22 (in a manner not shown here) in the opposite direction of the bevel of the end faces 11, 12 of the primary section 10. If the magnetic poles 21, 22 are beveled by an angle δ in the same direction as the bevel of the end faces 11, 12, then the angle of inclination β of the end faces 11, 12 is increased by the angle of inclination β of the magnetic poles; if the magnetic poles 21, 22 are beveled by an angle 13 in the opposite direction of the bevel of the end of the end faces 11, 12, then the angle of inclination b of the end faces 11, 12 is decreased by the angle of inclination δ. The following relationship applies to the angle of inclination β of the end faces 11, 12 of the primary section 10 in the case where the magnetic poles 21, 22 of the secondary section 20 are beveled by an angle δ:

$$\beta = \arctan(b/\tau_p) \pm \delta,$$

wherein

β is the angle of inclination of the beveled surfaces 11a, 12a at the end and rear front regions 11, 12 of the primary section 10, b is the electrically active width of the primary section 10, $\tau_p$ is the pitch of the poles 21, 22 of the secondary section 20, and δ is the bevel angle of the magnetic poles 21, 22 of the secondary section (20) which is inserted in the above equation with a positive sign if the magnetic poles 21, 22 are beveled in the same direction as the end faces 11, 12 of the primary section 10, and with a negative sign if the magnetic poles 21, 22 are beveled in the opposite direction of the end faces 11, 12 of the primary section 10.

It is understood that the longitudinal axes of the rotor grooves 14 according to FIG. 2 and the pole gaps 24 according to FIG. 3 can be beveled concurrently. It is also possible, either instead of or in addition to beveling the pole gaps 24, not to maintain a constant gap width s (as depicted in the FIGS. 1 to 3), but to instead change the gap width s continuously, resulting in conical pole gaps 24.

What is claimed is:

1. A synchronous linear motor comprising:

a primary section having a width and a length, said primary section being formed with rotor grooves for receiving a rotor winding; and a secondary section defining with the primary section a longitudinal axis and having a length which in a moving direction exceeds the length of the primary section, said secondary section including a sequence of permanent magnets, each of the magnets having two pole pairs acting as north and south poles and spaced from one another at formation of a pole gap, said primary section having front and rear end faces which are free of grooves and free of a winding and exhibit areas extending perpendicular to an air gap zone between the primary section and the secondary part and being beveled such as to define an angle of inclination which is selected with respect to the longitudinal axis in accordance with the following relationship:

$$\beta = \arctan(b/\tau_p),$$

wherein

β is the angle of inclination of the beveled areas at the front and rear end faces of the primary section, b is the electrically active width of the primary section, and $\tau_p$ is the pitch of the poles of the secondary section.

2. The synchronous linear motor of claim 1 wherein the rotor grooves of the primary section have, with respect to the longitudinal axis, an angle of inclination which is different from 90°.

3. The synchronous linear motor of claim 1 wherein the rotor grooves of the primary section are oriented perpendicular with respect to the longitudinal axis.

4. The synchronous linear motor of claim 1 wherein the pole gap between each one of the pole pairs of the secondary section has, with respect to the longitudinal axis, an angle of inclination which is different from 90°.

5. The synchronous linear motor of claim 1 wherein the angle of inclination of the end faces of the primary section is selected, at inclination of the magnetic poles of the secondary section about an angle, in accordance with the following relationship:

$$\beta = \arctan(b/\tau_p) \pm \delta,$$

wherein

β is the angle of inclination of the beveled areas of the front and rear end faces of the primary section, b the electrically active width of the primary section, $\tau_p$ the pitch of the poles of the secondary section, and δ the angle of inclination of the magnetic poles of the secondary section which in the above equation has a positive sign when the magnetic poles are beveled in the same direction as the end faces of the primary section, and has a negative sign when the magnetic poles are beveled in the opposite direction of the end faces of the primary section.

6. The synchronous linear motor of claim 1 wherein the pole gap between each of the pole pairs of the secondary section has a variable gap width.

7. The synchronous linear motor of claim 1 wherein the pole gap between each of the pole pairs of the secondary section is oriented perpendicular to the longitudinal axis.

8. The synchronous linear motor of claim 1, and further comprising attachment elements made of magnetically conducting material for securement to the front and rear end faces of the primary section, each one of the attachment elements having at least one beveled free end face.

9. The synchronous linear motor of claim 8 wherein the attachment elements are formed of ferromagnetic metallic sheets which are oriented perpendicular to the moving direction of the linear motor.

10. The synchronous linear motor of claim 1 wherein the rotor winding is a single-phase rotor winding.

11. The synchronous linear motor of claim 1 wherein the rotor winding is a multi-phase rotor winding.

* * * * *